United States Patent
Stradins

(10) Patent No.: US 12,463,585 B2
(45) Date of Patent: Nov. 4, 2025

(54) FOLDABLE SOLAR PANELS

(71) Applicant: Alliance for Sustainable Energy, LLC, Golden, CO (US)

(72) Inventor: Pauls Stradins, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 90 days.

(21) Appl. No.: 18/532,567

(22) Filed: Dec. 7, 2023

(65) Prior Publication Data
US 2024/0195352 A1    Jun. 13, 2024

Related U.S. Application Data

(60) Provisional application No. 63/386,946, filed on Dec. 12, 2022.

(51) Int. Cl.
*H02S 30/20* (2014.01)

(52) U.S. Cl.
CPC .................. *H02S 30/20* (2014.12)

(58) Field of Classification Search
CPC .......... H02S 30/20; H02S 40/20; H02S 40/22; H02S 10/40; B64G 1/44; B64G 1/443; H10F 77/488
See application file for complete search history.

(56) References Cited

U.S. PATENT DOCUMENTS

| | | | |
|---|---|---|---|
| 4,024,852 A | 5/1977 | L'Esperance et al. | |
| 4,230,094 A * | 10/1980 | Szulmayer | F24S 23/00 126/686 |
| 5,086,828 A * | 2/1992 | Ewert | B64G 1/50 136/246 |
| 5,660,644 A | 8/1997 | Clemens | |
| 7,301,095 B2 | 11/2007 | Murphy et al. | |
| 9,070,804 B2 | 6/2015 | Cousins | |
| 9,450,131 B1 | 9/2016 | Spence et al. | |
| 9,559,232 B1 * | 1/2017 | Naud | H02S 30/20 |
| 2008/0223429 A1 | 9/2008 | Everett et al. | |
| 2009/0308432 A1 * | 12/2009 | Meyers | H02S 40/44 136/246 |
| 2011/0023940 A1 | 2/2011 | Do et al. | |
| 2012/0103394 A1 | 5/2012 | Khazeni et al. | |
| 2012/0234369 A1 | 9/2012 | Everett et al. | |
| 2020/0185557 A1 | 6/2020 | Morgan et al. | |

FOREIGN PATENT DOCUMENTS

| | | | |
|---|---|---|---|
| EP | 0977273 A1 | 2/2000 | |
| KR | 10-1655249 | 9/2016 | |
| RU | 193323 U1 * | 10/2019 | .............. H02S 10/40 |

OTHER PUBLICATIONS

RU-193323-U1 English machine translation (Year: 2019).*

(Continued)

*Primary Examiner* — Andrew J Golden
(74) *Attorney, Agent, or Firm* — Michael A. McIntyre

(57) ABSTRACT

The present disclosure relates to a photovoltaic (PV) system that includes a plurality of interconnected sections, where each section includes a PV element and a reflective surface, where at least two sections have a folded state and an unfolded state, and each section is configured to be switched between the folded state and the unfolded state.

21 Claims, 7 Drawing Sheets

(56) References Cited

OTHER PUBLICATIONS

Afshari, H. et al., "Radiation tolerance of GaAs1-xSbx solar cells," Solar Energy Materials & Solar Cells, vol. 233, 2021, 7 pages.
Larsen & Toubro Limited, "Tracking Bifacial Solar Modules Wit Mirror Reflectors," Indian complete patent specification, Mar. 31, 2015, 12 pages.
Meyer, A. et al., "Miniature Passivated Contact Silicon Solar Cells: From Electrically Detected Magnetic Resonance to Space," SiliconPV 2022, 4 pages.

* cited by examiner

FOLDABLE SOLAR PANELS

CROSS-REFERENCE TO RELATED APPLICATIONS

This application claims priority from U.S. Provisional Patent Application No. 63/386,946 filed on Dec. 12, 2022, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Silicon photovoltaic (PV) panels are wafer based and not flexible and they cannot be folded. Space and portable applications require lightweight, flexible, and "foldable" panels that can be expanded to very large areas in space. On the other hand, space PV is increasingly more interested in Si PV because of their low cost. Thus, there remains a need for lightweight, foldable solar panels and/or solar panel systems, that can be reversibly switched between a first, folded, low volume, low exposed surface area state to a second folded, high exposed surface area state.

SUMMARY

An aspect of the present disclosure is a photovoltaic (PV) system that includes a plurality of interconnected sections, where each section includes a PV element and a reflective surface, where at least two sections have a folded state and an unfolded state, and each section is configured to be switched between the folded state and the unfolded state. In some embodiments of the present disclosure, the PV element may be bifacial. In some embodiments of the present disclosure, the PV element may be constructed using a material comprising at least one of silicon, CdTe, a perovskite, CIGS, an organic PV material, and/or a III-V alloy. In some embodiments of the present disclosure, the plurality of interconnected sections may be between 1 and 1000 sections inclusively.

In some embodiments of the present disclosure, the reflective surface may be substantially planar. In some embodiments of the present disclosure, the reflective surface may include at least one of a metallized plastic and/or a metallized glass. In some embodiments of the present disclosure, the plastic may include at least one of a polyester, a polyamine, a polyamide, a polyimide, polytetrafluoroethylene, and/or polyetherimide. In some embodiments of the present disclosure, a metal used to metallize the at least one metallized plastic and/or metallized glass comprises at least one of copper, gold, silver, and/or aluminum. In some embodiments of the present disclosure, the reflective surface may have a height ($h=H_f$) between 0.1 cm and 40 cm or between 0.5 cm and 5 cm. In some embodiments of the present disclosure, the reflective surface may have a width (in the z-axis direction) between 0.5 cm and 100 cm or between 2 cm to 10 cm.

In some embodiments of the present disclosure, the PV element may have a height (in the y-axis direction) between 0.1 cm and 40 cm or between 0.5 cm and 25 cm, or between 0.5 cm to 5 cm. In some embodiments of the present disclosure, the PV system may have a height in the folded state, $H_f$, a height in the unfolded state, $H_{uf}$, where the ratio of $H_{uf}$ to $H_f$ ($H_{uf}:H_f$) is less than 1.0. In some embodiments of the present disclosure, the PV system may have a width in the folded state, $W_f$, a width in the unfolded state, $W_{uf}$, where the ratio of $W_{uf}$ to $W_f$ ($W_{uf}:W_f$) is between 10:1 and 1000:1.

In some embodiments of the present disclosure, each section may include one PV element and two reflective surfaces. Further, for each section, both reflective surfaces may have a first edge aligned with a first axis (z), the PV element may have a first edge aligned with the first axis (z), the two reflective surfaces may be connected via their respective first edges, forming a base, the first edge of the PV element may be positioned adjacent to the base, each base may be configured to allow the reversible switching of its section between the folded state and the unfolded state, both reflective surfaces may have a second edge positioned parallel with its respective first edge, the second edges of adjacent sections may be connected, forming an apex, and each apex may be configured to allow the reversible switching of the sections between the folded state and the unfolded state.

In some embodiments of the present disclosure, the PV system may further include an actuator configured to switch each section between the folded state and the unfolded state. In some embodiments of the present disclosure, the actuator may include a plurality of telescoping segments. In some embodiments of the present disclosure, the PV system may include for each section, a cover that is substantially transparent to light, where the cover is positioned over the PV element and the two reflective surfaces, forming an empty space encompassed by the cover and the two reflective surfaces. In some embodiments of the present disclosure, the cover may be configured to focus light onto the PV element. In some embodiments of the present disclosure, PV system may further include at least one flexible point or hinge positioned at each base of each section, where each first edge of each reflective surface is capable of moving around the first axis when the PV system is switched between states.

An aspect of the present disclosure is a method for generating power using a PV system as described herein, where the method includes radiating the PV system with light, the PV element further includes a second edge, the PV element is bifacial and has a first light absorbing surface and a second light absorbing surface, both the first light absorbing surface and the second light absorbing surface are positioned between the first edge of the PV element and the second edge of the PV element, and the PV system is positioned such that the direction of the light is substantially parallel to the first light absorbing surface and the second light absorbing surface.

BRIEF DESCRIPTION OF DRAWINGS

Some embodiments are illustrated in referenced figures of the drawings. It is intended that the embodiments and figures disclosed herein are to be considered illustrative rather than limiting.

REFERENCE NUMERALS

Figure 1:
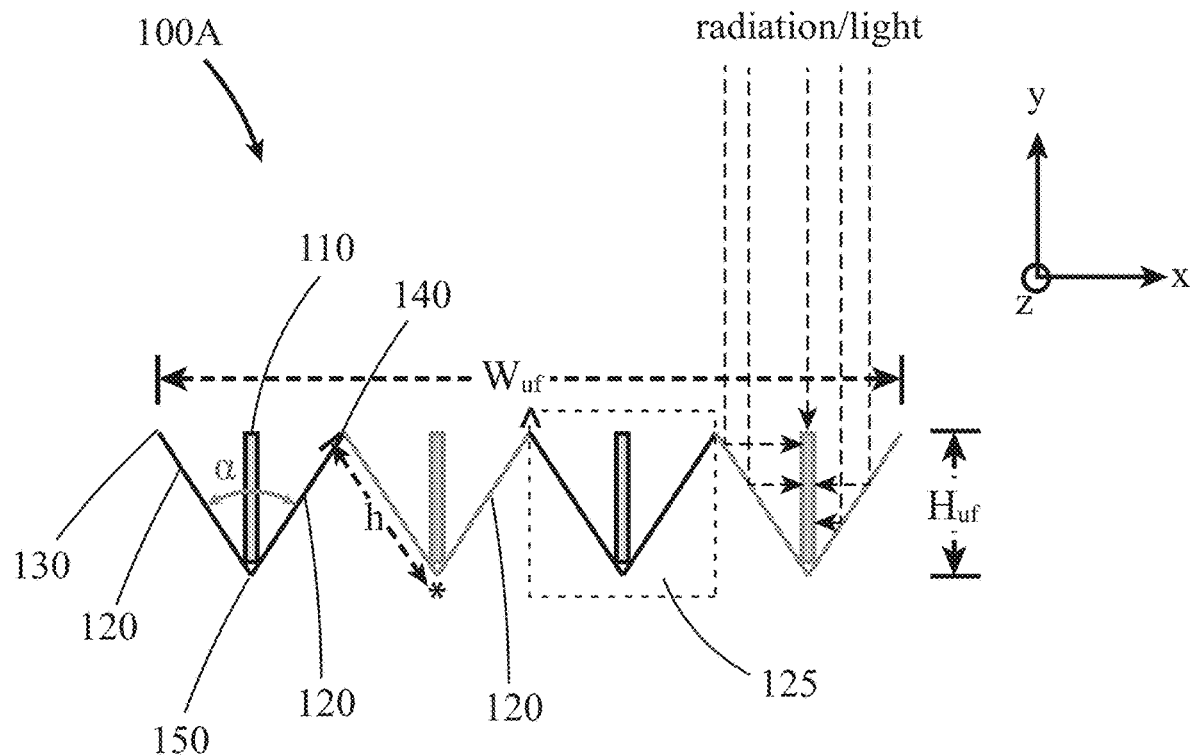
FIG. 1 illustrates a photovoltaic (PV) system, according to some embodiments of the present disclosure, in an unfolded state as shown in Panel A and a folded state as shown in Panel B.
Figure 1:
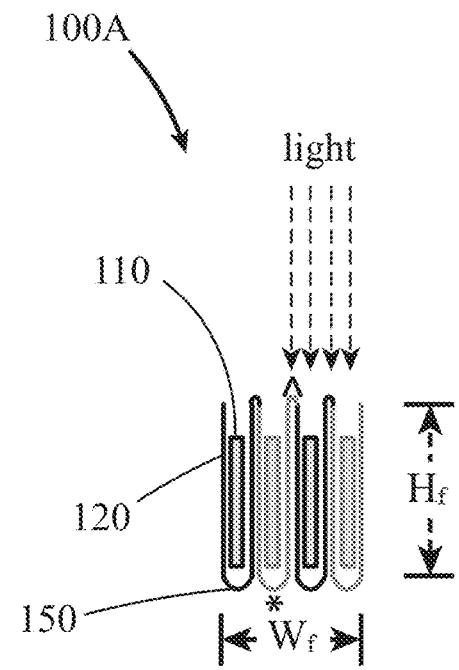

100 . . . photovoltaic (PV) system
110 . . . PV element
120 . . . reflective surface
125 . . . section
140 . . . apex
145 . . . apex edge
150 . . . base
155 . . . base edge
400 . . . insulating portion
410 . . . current collector
420 . . . finger
430 . . . bus-bar
440 . . . substrate
500 . . . insulator
600 . . . actuator
610 . . . actuator segment
620 . . . cover

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to reversibly foldable photovoltaic (PV) systems having two or more PV elements, e.g., solar panels and/or solar modules having multiple solar cells. As described in more detail below, each solar panel and/or module may be combined with at least one reflective surface, forming what is referred to herein as a "section" of the PV system. Each section may then be configured to be reversibly switched between a compact folded state suitable, for example, for the deployment of a satellite into space, and an extended, unfolded state configured to maximize the amount of PV surface area available for collecting solar energy once a satellite is positioned in orbit. The specific dimensions, sizes, surface areas, etc., of a foldable PV system as described herein will depend upon the satellite and/or other space-based system it is designed for. However, for exemplary purposes, in some embodiments of the present disclosure, a PV element of a section may be a relatively small silicon cell (e.g., ~5 cm long, between 1 mm and 2 mm wide, and ~150 microns thick) combined with two reflective surfaces constructed using metallized thin plastic foil (e.g., ~50 microns thick substrate with a ~1 micron Ag coating). Each section may be configured to be folded and unfolded. For such a PV system, as described in more detail below, each PV element (e.g., solar panel and/or solar module) may have a first edged fixed at the bottom to a bendable and/or hinge-like portion of the section formed by the convergence of opposing edges of each reflective surface, with each PV element's outer edge positioned significantly towards the incoming light (e.g., from the sun). The light may then be reflected from the reflective surface, resulting in the illumination of both sides of PV element (i.e., bifacial PV element). In some embodiments of the present disclosure, a reflective surface may be metallized so that in addition to being reflective, the surface may also serve as an electric conductor. In some embodiments of the present disclosure, a reflective surface may not be electrically conductive.

There are several advantages to this design. For example, the length of an unfolded PV system may be increased by up to 20 times, compared to the folded system. For example, an extended (i.e., unfolded) PV system having approximate dimensions of 1 meter by 1 meter (1 m×1 m) may be folded to approximately 5 cm×1 m. Further, by providing bifacial PV elements, the relative weight for the same power production rating, compared to monofacial PV elements is reduced by approximately 50%. This bifaciality also provides effective concentration of the incident sunlight by about 2× onto the cell, resulting in higher voltages by about 20 mV produced by each PV element as compared to a monofacial PV element. Further, by exposing both surfaces of a PV element exposed to the ambient environment, the PV element is more efficiently cooled by radiative cooling. In addition, by positioning the edge of a PV element towards the incident rays of the sun, i.e., by placing the power producing surfaces of the PV elements perpendicular to the incident rays of the sun, radiation damage to the PV elements is greatly reduced, because most of the incident gamma rays, protons, and electrons are absorbed by the reflective surfaces, not the PV panels. Thus, the PV systems described herein also eliminate and/or reduce the need for UV mitigating encapsulants. Instead, the reflective surfaces may be coated with lightweight UV absorbing materials, thereby further reducing the overall weight of the PV systems.

Figure 3:
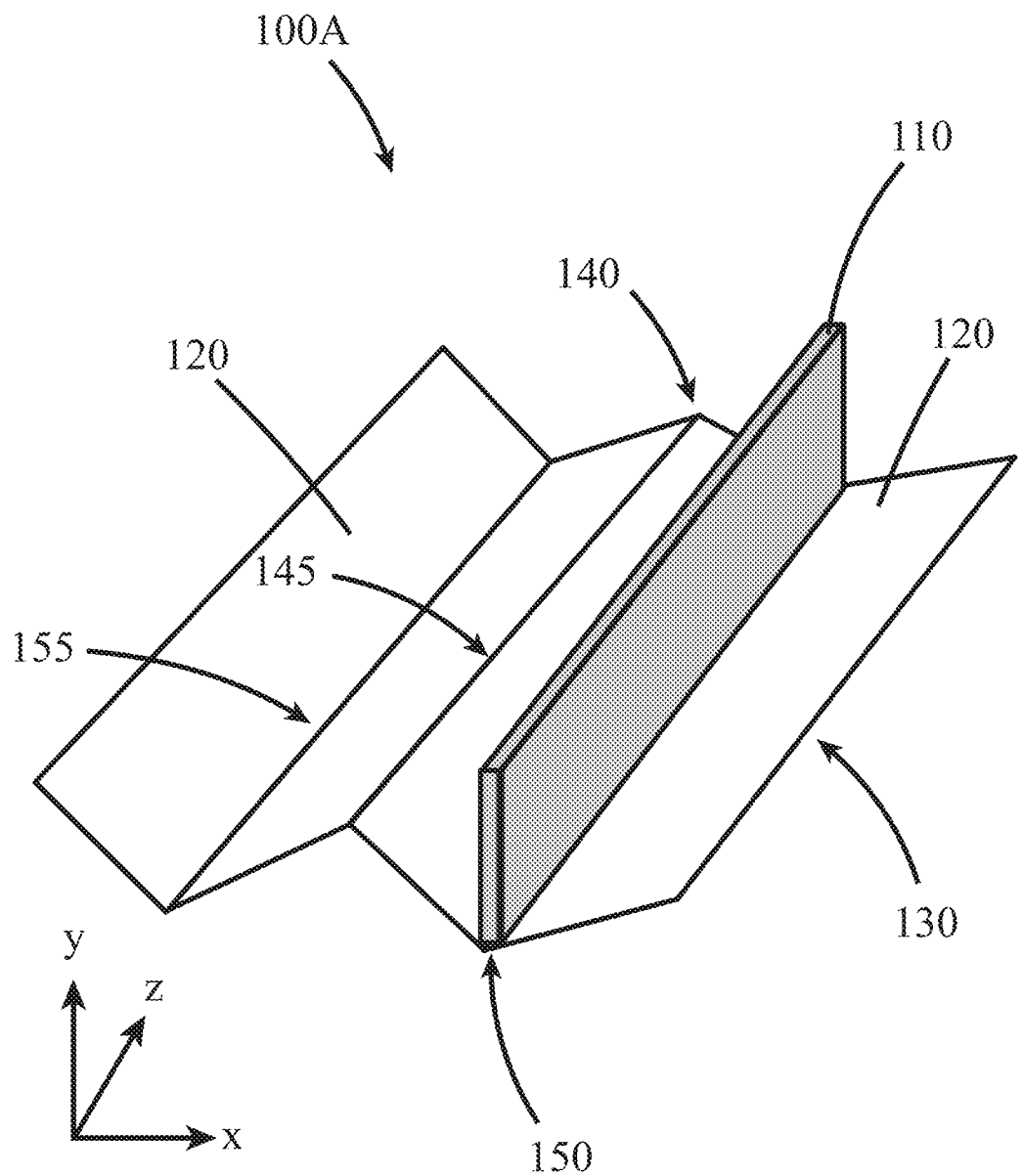
FIG. 3 illustrates an isometric drawing of a PV system like that illustrated in FIG. 1, according to some embodiments of the present disclosure.

FIG. 1 illustrates a two-dimensional drawing of a photovoltaic (PV) system 100A, according to some embodiments of the present disclosure. FIG. 3 illustrates a three-dimensional drawing of the unfolded PV system 100A illustrated in Panel A of FIG. 1. Panel A of FIG. 1 illustrates the PV system 100A in an unfolded state. Panel B of FIG. 1 illustrates the PV system 100A in a folded state. In this example, the PV system 100A is constructed of multiple sections 125 (four illustrated with one specifically outlined by a dashed box) connected in series along the x-axis direction, with each section including two reflective surfaces 120 and at least one PV element 110. Referring to Panel A of FIG. 1, the two reflective surfaces 120 of a section may be connected along parallel edges extending out of the page, parallel with the z-axis direction. This connection of the two reflective surfaces 120 of a section 125 is referred to herein as a base 150. A base 150, as described in more detail below, may be configured to enable the reversible movement of the reflective surfaces 120 forming a base 150 when switching from a PV system's folded state to the folded state (or vice versa). Thus, in some embodiments of the present disclosure, a base 150 may be constructed using a hinge and/or an element having a hinge-like and/or flexible characteristic.

Referring again to FIG. 1, each section 125 may have a PV element 110 positioned between the section's two reflective surfaces 120. Like the reflective surfaces 120, an edge of a PV element 110 may be positioned substantially parallel with the edges of the reflective surfaces 120 forming the base 150; each of the three edges may be positioned substantially parallel with each other relative to the z-axis direction. In some embodiments of the present disclosure, the edge of a PV element 110 may be positioned within, adjacent to, along the base 150, such that the reflective surfaces 120 can move reversibly relative to the three edges (one each for the first and second reflective surfaces and the PV element) aligned along the z-axis direction. This axis of rotation (the z-axis) around which the reflective surfaces 120 move relative to a base 150 and base edge 155 is called out in one of the four sections 125 by an asterisk (*). Referring to Panel B of FIG. 1, when in the folded state, the reflective surfaces 120 may rotate relative to the base 150 to the point where the two reflective surfaces 120 and the PV element 110 are aligned substantially parallel with each other. The edges connecting neighboring sections 125 at the base 150 are referred to herein as "base edges" 155 (not shown in FIG. 1; see FIG. 3).

Referring again to FIG. 1, each section 125 of a PV system 100A may be connected to at least one neighboring section 125, thereby forming a series of interconnected sections.

Neighboring sections 125, in addition to being connected at their base edges 155, may also be connected along an additional edge of each of the two neighboring sections 125. This second connection between neighboring sections 125 is referred to herein as an apex 140, which is formed by the connection of the additional edges of each neighboring section 125. Thus, each reflective surface 120 may have, in addition to a base edge 155, a second edge, referred to herein as an "apex edge" 145 (see FIG. 3), that may be positioned substantially parallel to the base edge, where the distance between the base edge 155 and the apex edge in the xy-plane defines the height, h, of a reflective surface 120. The height, h, is called out in Panel A of FIG. 1. Both a base edge 155 and an apex edge are called out in FIG. 3. This second connection of the two reflective surfaces 120 of two neighboring sections 125, forming the apex 140, like the base 150, may be configured to enable the reversible movement of the reflective surfaces 120 forming the apex 140 when switching between a PV system's folded state to the folded state (or vice versa). Thus, in some embodiments of the present disclosure, an apex 140 may be constructed using a hinge and/or an element having a hinge-like and/or flexible characteristic. Referring again to FIG. 1, the axis around which the reflective panels 120 move relative to an apex 140 and apex edge 145 is marked with a "^".

FIG. 1 illustrates that the height, H, and width, W, of a PV system 100A may be increased greatly when switching from the folded state (Panel B) to the unfolded state (Panel A). The height of the folded system, $H_f$, may be reduced when switching to the unfolded system, $H_{uf}$. The change in height will depend on the dimensions of the system and the final angle of a section's 125 base 150 when fully unfolded. The relative change in height can be expressed as the ratio of $H_{uf}$ to $H_f$ (i.e., $H_{uf}$:$H_f$ or $H_{uf}/H_f$). In some embodiments of the present disclosure, $H_{uf}/H_f$ may be less than 1.0. The angle at the base 150 when fully extended, α, is called out in Panel B of FIG. 1. In some embodiments of the present disclosure, α when a PV system 100 is unfolded may be between 10 degrees and 180 degrees. The relative change in the width of a PV system 100A, between folded, $W_f$, and unfolded, $W_{uf}$, may be expressed as the ratio of $W_{uf}$ to $W_f$ (i.e., $W_{uf}$:$W_f$ or $W_{uf}/W_f$). In some embodiments of the present disclosure, $W_{uf}/W_f$ may be between 10:1 and 1000:1.

Among other benefits, the PV system 100A as described herein, minimizes the exposure of the PV system's energy-generating surfaces to incoming radiation from the sun. Referring to Panel A of FIG. 1, the PV system may be oriented so that the energy-generating surfaces of the PV elements 110 are positioned substantially parallel to the rays of the light source (e.g., sunlight) and substantially perpendicular to the reflected light. Thus, only the outer most edge of each PV element 110 is directly impinged upon by the incoming radiation/light, thereby reducing or eliminating the damage that can occur to the PV elements due to exposure to gamma rays, protons, and/or electrons. Further, a significant fraction of impinging radiation that approaches the cell isotropically, may also be blocked by the reflective foil. The radiation onto the cell can be further reduced by covering the foldable PV system in FIG. 1, with a transparent top cover, similarly foldable as the foldable back reflector 120 of FIG. 1 (see FIG. 6). Instead, the reflective surfaces will receive most of the exposure to gamma rays, protons, and/or electrons, while also redirecting only the electromagnetic radiation, i.e., sunlight, to the energy-generating surfaces of the PV element(s) 110. FIG. 1 illustrates the direction of the incoming light as oriented substantially parallel to the height direction (i.e., parallel to the y-axis) of the PV elements 110 and the incoming light being reflected about 90 degrees from the reflective surfaces 120 and impinging orthogonally onto the energy-generating surfaces of the PV elements 110. This is illustrated in this fashion for illustrative purposes and the angles of the incoming light and/or reflected light relative to a PV element 110, a reflective surface 120, and/or any other element of the PV systems described herein may vary depending on the application and/or specific design details of a PV system 100.

Figure 2:
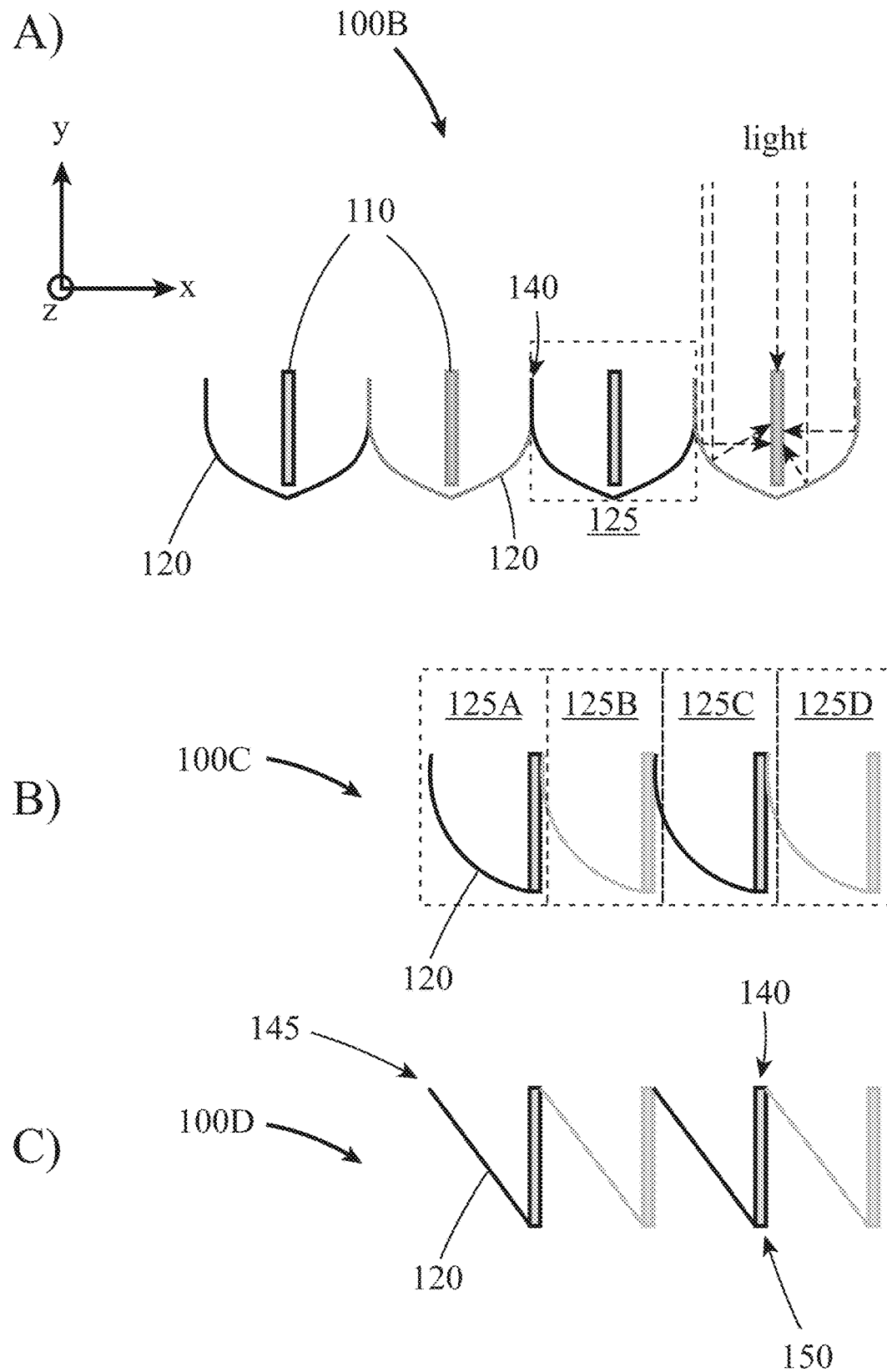
FIG. 2 illustrates three examples of a PV system, according to some embodiments of the present disclosure.

FIG. 1 illustrates one example of a PV system 100A, according to some embodiments of the present disclosure. Variations on the design concepts illustrated in FIG. 1, and described above, are also possible and fall within the scope of the present disclosure. FIG. 2 illustrates some exemplary designs. Panel A of FIG. 2 illustrates a PV system 100B, where each section 125 has two curved reflective surfaces 120. Panel B of FIG. 2 illustrates a PV system 100C, where each section 125 has a single curved reflective surface 120. Panel C of FIG. 2 illustrates a PV system 100D, where each section 125 has a single, flat planar reflective surface 120. Thus, in some embodiments of the present disclosure, the cross-section of a reflective surface 120 may be something other than a straight line. In other words, a reflective surface 120 may be something other than a flat, planar surface, and may instead have a curved surface, e.g., a concave surface. In some embodiments of the present disclosure, a reflective surface 120 may have a cross-section that is non-linear, for example a cross-section described by a polynomial equation. In some embodiments of the present disclosure, a reflective surface 120 may have a cross-section that defines a parabolic curve and/or an elliptical curve. In some embodiments of the present disclosure, a section 125 of a PV system 100B, a non-linear cross-section of a reflective surface 120 may be attained only when the system is unfolded, whereas while in an unfolded state, the cross-section of the reflective surface 120 may be substantially straight (i.e., linear). This change in the shape of the cross-section of a reflecting surface 120 after unfolding might be achieved in certain embodiments, by engineering built-in stresses into the reflective foil. For example, a reflective surface 120 may be manufactured as a bilayer, where each layer is stressed against the other (e.g., a top layer facing the cell with tensile stress, and a bottom layer of the reflective surface 120 with compressive stress).

Referring again to FIG. 1, in some embodiments of the present disclosure, a reflective surface 120 may have a height, h=$H_f$, between 0.1 cm and 40 cm or between 0.5 cm and 5 cm. In some embodiments of the present disclosure, a reflective surface 120 may have a width in the z-axis direction between 0.5 cm and 100 cm or between 2 cm to 10 cm. In some embodiments of the present disclosure, a reflective surface 120 may have a surface area between 0.1 $cm^2$ and 4000 $cm^2$. Thus, the reflective area of a single section 125 may be about double this range, 0.2 $cm^2$ and 8000 $cm^2$, and the reflective surfaces of a system 100 may be n times this range, where n is the number of sections 125 contained in the system 100. In some embodiments of the present disclosure, n may be between 1 and 1000 inclusively.

Referring again to FIG. 1, in some embodiments of the present disclosure, a PV element 110 may have a height in the y-axis direction between 0.1 cm and 40 cm or between 0.5 cm and 25 cm, or between 0.5 cm to 5 cm. In some embodiments of the present disclosure, a PV element 110 may have a width in the z-axis direction between 0.5 cm and 100 cm or between 2 cm to 10 cm. In some embodiments of the present disclosure, a PV element 110 may have a surface area on a single side between 0.025 $cm^2$ and 4000 $cm^2$ or between 0.1 $cm^2$ and 2500 $cm^2$.

In some embodiments of the present disclosure, a PV element 110 may be constructed using any suitable photovoltaic material, with examples including at least one of silicon, CdTe, a perovskite, CIGS, an organic PV material, or a III-V alloy. A PV element 110 will also include the other elements needed for a fully functional solar cell; e.g., current collectors, charge transport layers, antireflection coatings, coatings to reduce radiation damage etc., as needed for a particular solar cell device stack/architecture.

Figure 4A:
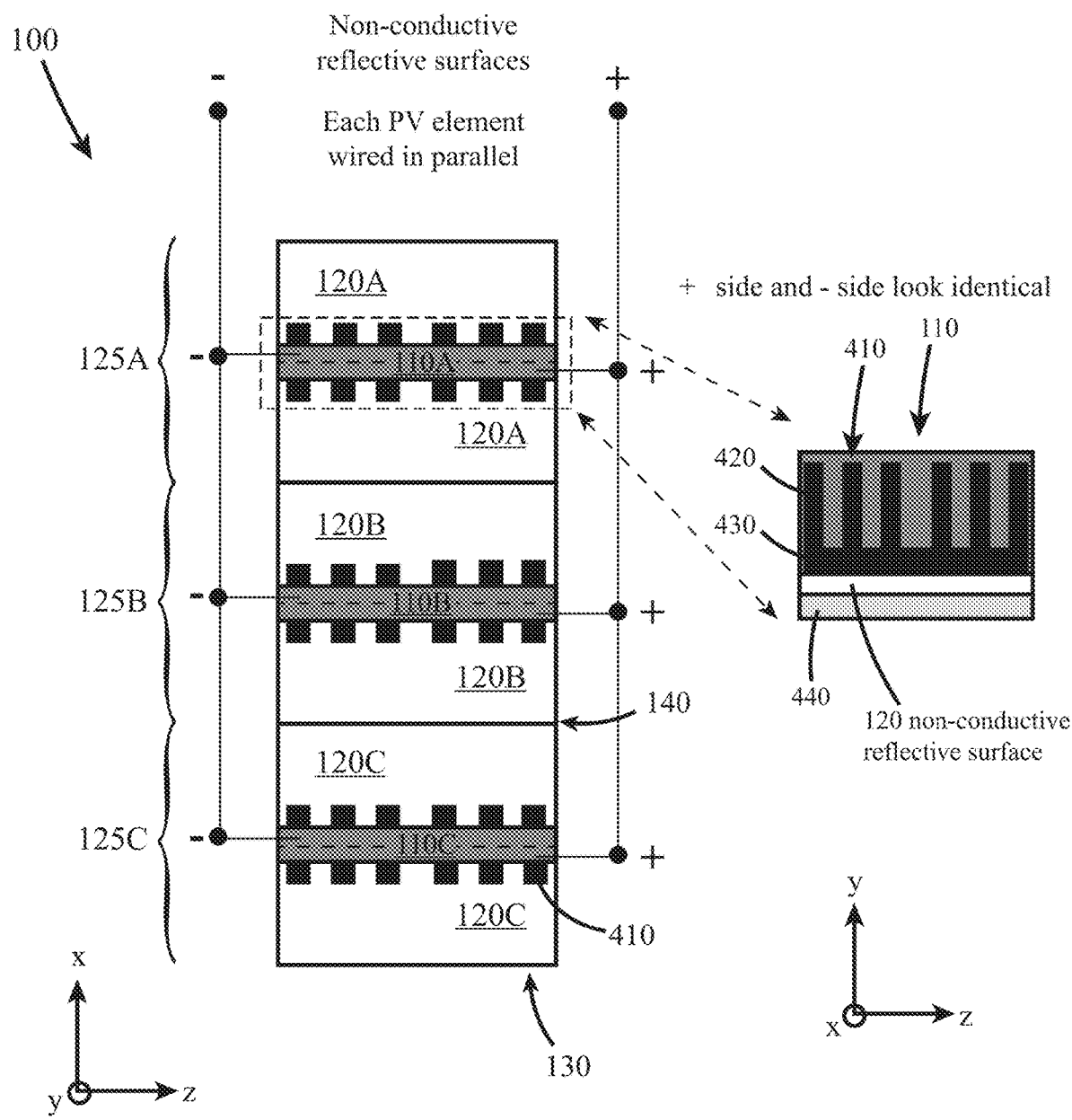
FIG. 4A illustrates a PV system utilizing non-conductive reflective surfaces with the PV elements of neighboring sections electrically connected in parallel, according to some embodiments of the present disclosure.
Figure 4B:
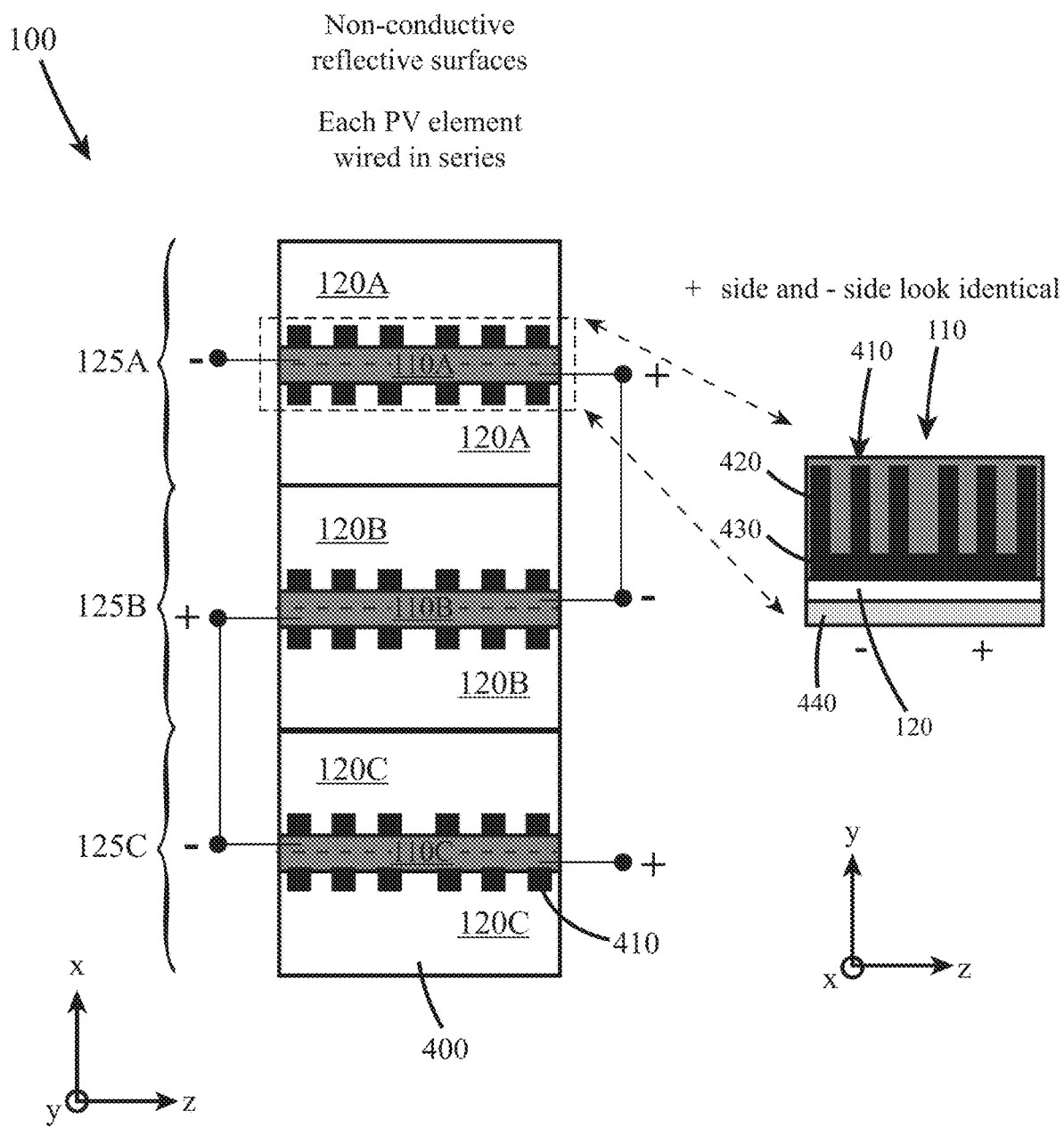
FIG. 4B illustrates a PV system utilizing non-conductive reflective surfaces with the PV elements of neighboring sections electrically connected in series, according to some embodiments of the present disclosure.

As described above, in some embodiments of the present disclosure, a reflective surface 120 of a PV system may be either reflective and conductive or a reflective surface 120 may be just reflective (and non-conductive). When reflective and conductive, the reflective surfaces 120 of a PV system 100 may be used as the electrical connections between the various PV elements 110 of the PV system 100. FIGS. 4A and 4B illustrate examples for reflective surfaces 120 that are only reflective (non-conductive). FIG. 4A illustrates a PV system 100 where the various PV elements 110 are connected electrically in parallel. FIG. 4B illustrates a PV system 100 where the various PV elements 110 are connected electrically in series. Both FIGS. 4A and 4B illustrates that a reflective, non-conductive surface 120 may be positioned on a substrate 440 and that a PV element 110 may include a plurality of conductive fingers 410 for creating current collectors, with each conductive finger 410 terminating at one end at a bus-bar 430. Electrically connecting the various PV elements 110 of systems like those shown in FIGS. 4A and 4B may be achieved using wiring, as indicated by the lines connected to the various nodes (black circles).

Referring again to FIGS. 4A and 4B, in some embodiments of the present disclosure, a non-conductive, reflective surface 120 may be constructed using a transparent plastic foil (such as Mylar®) or thin glass, metallized on the backside (facing away from the cell), or a thin metal foil with a transparent and electrically insulating coating having a thickness between 5 µm and 5000 µm. In some embodiments of the present disclosure, a substrate 440 for a non-conductive, reflective surface 120 may be constructed using a plastic (such as Mylar®) or glass foil having a thickness between 5 µm and 5000 µm. In some embodiments of the present disclosure, the fingers 410 and/or bus-bar 430 of a current collector may be constructed using at least one of silver, copper, and/or aluminum, with a thickness between 0.1 µm and 50 µm. In some embodiments of the present disclosure, a reflective surface 120 may be constructed using a combination of copper and silver.

Figure 5:
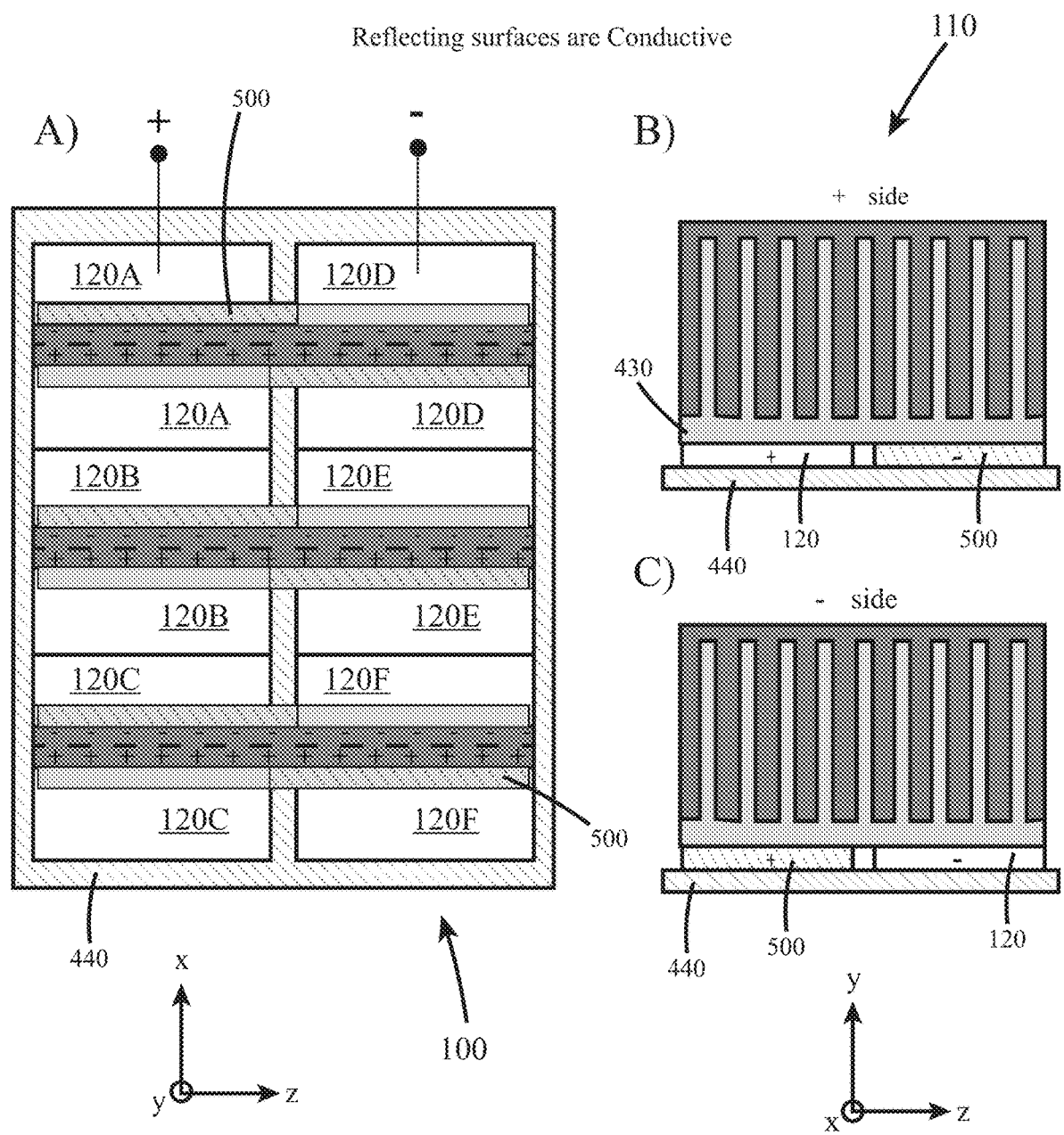
FIG. 5 illustrates a PV system utilizing conductive and reflective surfaces, according to some embodiments of the present disclosure.

FIG. 5 illustrates a PV system 100 where the reflective surfaces 120 are reflective and conductive. In some embodiments of the present disclosure, a PV system 100 like that illustrated in FIG. 5 may utilize an insulator 500 positioned between the bus-bars 430 of the current collectors in order to electrically separate the hole-collecting side of the PV element from the electron-collecting side of the PV element. In some embodiments of the present disclosure, a conductive and reflective surface 120 may be constructed using a plastic (such as Mylar®) and/or glass foil, metallized on the front side (facing cell) by deposition of an electrically conductive and optically reflective coating such as silver or aluminum, with a thickness between 5 µm and 5000 µm. In some embodiments of the present disclosure, a substrate 440 for a conductive and reflective surface 120 may be constructed using plastic (such as Mylar®) and/or glass foil having a thickness between 3 µm and 5000 µm.

Figure 6:
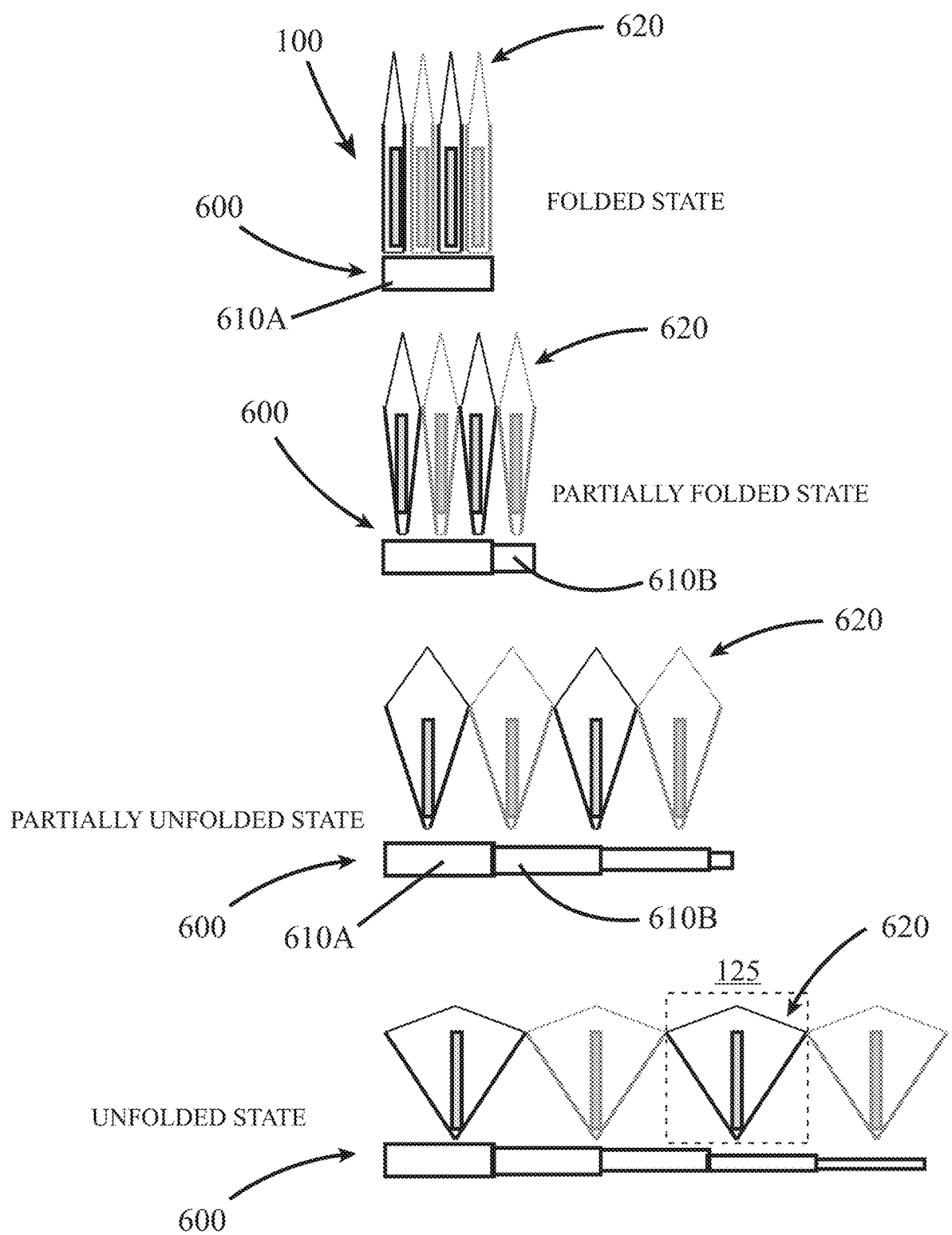
FIG. 6 illustrates a PV system that includes an actuator configured for reversibly switching the PV system from a folded state to an unfolded state, according to some embodiments of the present disclosure.

FIG. 6 illustrates an example of an actuator 600 for extending a PV system 100 from an initial folded state to a fully extended state. This actuator 600 is provided for illustrative purposes only and other devices, systems, and methods for extending a PV system 100 from a folded state to an unfolded state fall within the scope of the present disclosure. The exemplary actuator 600 utilizes a plurality (5) of telescoping segments 610 (two specifically called out 610A and 610B). Such a telescoping design for an actuator 600 may have between 2 and 100 segments, depending on the number of sections 125.

Referring again to FIG. 6, in some embodiments of the present disclosure, a system 100 may include a cover 620. As illustrated in FIG. 6, a cover 620, may be included with each section 125 of the system 100 and may be configured to fold and unfold in a fashion similar to the reflective surfaces 120. Among other things, a cover 620, while being substantially transparent to light, e.g., sunlight, may be configured to provide protection to the underlying PV element 110 and reflective surfaces 120. In some embodiments of the present disclosure, a cover 620 may assist with focusing a larger percentage of the incident light onto the PV elements. Like the reflective surfaces 120, pairs of surfaces used to construct a cover 620 may have one or more flexible points or hinges, to allow the cover to fold and unfold.

EXAMPLES

Example 1. A photovoltaic (PV) system comprising: a plurality of interconnected sections, wherein: each section comprises: a PV element; and a reflective surface; at least two sections have a folded state and an unfolded state, and each section is configured to be switched between the folded state and the unfolded state.

Example 2. The PV system of Example 1, wherein each section comprises two reflective surfaces.

Example 3. The PV system of either Example 1 or Example 2, wherein the PV element comprises at least one PV cell.

Example 4. The PV system of any one of Examples 1-3, wherein the PV element is a PV module comprising two or more PV cells.

Example 5. The PV system of any one of Examples 1-4, wherein the PV element is bifacial.

Example 6. The PV system of any one of Examples 1-5, wherein the PV element is constructed using a material comprising at least one of silicon, CdTe, a perovskite, CIGS, an organic PV material, or a III-V alloy.

Example 7. The PV system of any one of Examples 1-6, wherein the plurality of interconnected sections comprises between 1 and 1000 sections, inclusively.

Example 8. The PV system of any one of Examples 1-7, wherein the reflective surface is substantially planar.

Example 9. The PV system of any one of Examples 1-8, wherein the reflective surface is curved.

Example 10. The PV system of any one of Examples 1-9, wherein the reflective surface is concave.

Example 11. The PV system of any one of Examples 1-10, wherein the reflective surface comprises at least one of a metallized plastic or a metallized glass.

Example 12. The PV system of any one of Examples 1-11, wherein the plastic comprises at least one of a polyester, a polyamine, a polyamide, a polyimide, polytetrafluoroethylene, or polyetherimide.

Example 13. The PV system of any one of Examples 1-12, wherein the polyester comprises polyethylene terephthalate (PET).

Example 14. The PV system of any one of Examples 1-13, wherein the plastic is biaxially-oriented.

Example 15. The PV system of any one of Examples 1-14, wherein the plastic is biaxially-oriented PET (Mylar®).

Example 16. The PV system of any one of Examples 1-15, wherein a metal used to metallize the at least one metallized plastic or metallized glass comprises at least one of copper, gold, silver, or aluminum.

Example 17. The PV system of any one of Examples 1-16, wherein the metal forms a layer having a thickness between 5 µm and 5000 µm.

Example 18. The PV system of any one of Examples 1-17, wherein the layer comprises a first layer of copper and a second layer of at least one of gold or silver.

Example 19. The PV system of any one of Examples 1-18, wherein the reflective surface has a height ($h=H_f$) between 0.1 cm and 40 cm or between 0.5 cm and 5 cm.

Example 20. The PV system of any one of Examples 1-19, wherein the reflective surface has a width (in the z-axis direction) between 0.5 cm and 100 cm or between 2 cm to 10 cm.

Example 21. The PV system of any one of Examples 1-20, wherein the reflective surface has a surface area between 0.1 cm$^2$ and 4000 cm$^2$.

Example 22. The PV system of any one of Examples 1-21, wherein the PV element has a height (in the y-axis direction) between 0.1 cm and 40 cm or between 0.5 cm and 25 cm, or between 0.5 cm to 5 cm.

Example 23. The PV system of any one of Examples 1-22, wherein the PV element has a width (in the z-axis direction) between 0.5 cm and 100 cm or between 2 cm to 10 cm.

Example 24. The PV system of any one of Examples 1-23, wherein the PV element has a surface area on a single side between 0.025 cm$^2$ and 4000 cm$^2$ or between 0.1 cm$^2$ and 2500 cm$^2$.

Example 25. The PV system of any one of Examples 1-24, wherein: the PV system has a height in the folded state, $H_f$, a height in the unfolded state, $H_{uf}$, and the ratio of $H_{uf}$ to $H_f$ ($H_{uf}:H_f$) is less than 1.0.

Example 26. The PV system of any one of Examples 1-25, wherein: the PV system has a width in the folded state, $W_f$, a width in the unfolded state, $W_{uf}$, and the ratio of $W_{uf}$ to $W_f$ ($W_{uf}:W_f$) is between 10:1 and 1000:1.

Example 27. The PV system of any one of Examples 1-26, wherein: each section comprises one PV element and two reflective surfaces, for each section, both reflective surfaces have a first edge aligned with a first axis (z), for each section, the PV element has a first edge aligned with the first axis (z), for each section, the two reflective surfaces are connected via their respective first edges, forming a base, the first edge of the PV element is positioned adjacent to the base, each base is configured to allow the reversible switching of its section between the folded state and the unfolded state, for each section, both reflective surfaces have a second edge positioned parallel with its respective first edge, the second edges of adjacent sections are connected, forming an apex, and each apex is configured to allow the reversible switching of the sections between the folded state and the unfolded state.

Example 28. The PV system of any one of Examples 1-27, further comprising an actuator configured to switch each section between the folded state and the unfolded state.

Example 29. The PV system of any one of Examples 1-28, wherein the actuator comprises a plurality of telescoping segments.

Example 30. The PV system of any one of Examples 1-29, further comprising for each section, a cover wherein: the cover is substantially transparent to light, and the cover is positioned over the PV element and the two reflective surfaces, forming an empty space encompassed by the cover and the two reflective surfaces.

Example 31. The PV system of any one of Examples 1-30, wherein the cover is configured to focus light onto the PV element.

Example 32. The PV system of any one of Examples 1-31, further comprising: at least one flexible point or hinge positioned at each base of each section, wherein: each first edge of each reflective surface is capable of moving around the first axis when the PV system is switched between states.

Example 33. A method for generating power using a PV system as described in any one of Examples 1-32, the method comprising: radiating the PV system with light, wherein: the PV element further comprises a second edge, the PV element is bifacial and comprises a first light absorbing surface and a second light absorbing surface, both the first light absorbing surface and the second light absorbing surface are positioned between the first edge of the PV element and the second edge of the PV element, and the PV system is positioned such that the direction of the light is substantially parallel to the first light absorbing surface and the second light absorbing surface.

Example 34. The method of any one of Examples 1-33, wherein the light is reflected from at least one of the reflective surfaces, resulting in the reflected light impinging on at least one of the first light absorbing surface or the second light absorbing surface.

Example 35. The method of any one of Examples 1-34, wherein the light impinges upon the at least one of the first light absorbing surface or the second light absorbing surface at a direction that is substantially orthogonal to the first light absorbing surface or second light absorbing surface.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A photovoltaic (PV) system comprising:
a first section and a second section, wherein:
each section has a folded state and an unfolded state,
each section is configured to be switched between the folded state and the unfolded state, and
each section comprises:
a PV element;
a first reflective surface and a second reflective surface, wherein:
the first reflective surface has a first edge aligned parallel to a first reference axis,
the second reflective surface has a second edge aligned parallel to the first reference axis,
the PV element has a third edge aligned parallel to the first reference axis,
the first edge and the second edge are moveably connected forming a base,
the third edge is positioned at the base adjacent to the first edge and the second edge, and
the PV element is positioned between the first reflective surface and the second reflective surface.

2. The PV system of claim 1, wherein the PV element is bifacial.

3. The PV system of claim 1, wherein the PV element is constructed using a material comprising at least one of silicon, CdTe, a perovskite, CIGS, an organic PV material, or a III-V alloy.

4. The PV system of claim 1, comprising between 2 and 1000 sections, inclusively.

5. The PV system of claim 1, wherein each reflective surface is substantially planar.

6. The PV system of claim 1, wherein each reflective surface comprises at least one of a metallized plastic or a metallized glass.

7. The PV system of claim 6, wherein the plastic comprises at least one of a polyester, a polyamine, a polyamide, a polyimide, polytetrafluoroethylene, or polyetherimide.

8. The PV system of claim 6, wherein a metal used to metallize the at least one metallized plastic or metallized glass comprises at least one of copper, gold, silver, or aluminum.

9. The PV system of claim 1, wherein the each reflective surface has a height between 0.1 cm and 40 cm, relative a second reference axis perpendicular to the first reference axis.

10. The PV system of claim 1, wherein each reflective surface has a width between 0.5 cm and 100 cm, relative to the first reference axis.

11. The PV system of claim 1, wherein the PV element has a height between 0.1 cm and 40 cm, relative to the first reference axis.

12. The PV system of claim 1, wherein:
the PV system has a height in the folded state, $H_f$,
a height in the unfolded state, $H_{uf}$,
both $H_f$ and $H_{uf}$ are relative to the second reference axis, and
the ratio of $H_{uf}$ to $H_f$ ($H_{uf}$: $H_f$) is greater than or equal to 1.0.

13. The PV system of claim 1, wherein:
the PV system has a width in the folded state, $W_f$,
a width in the unfolded state, $W_{uf}$, and
both $W_f$ and $W_{uf}$ are relative to a third reference axis perpendicular to the first reference axis and the second reference axis, and
the ratio of $W_{uf}$ to $W_f$ ($W_{uf}$: $W_f$) is between 10:1 and 1000:1.

14. The PV system of claim 1, wherein:
the first reflective surface comprises a fourth edge aligned parallel to the first reference axis,
the second reflective surface comprises a fifth edge aligned parallel to the first reference axis, and
the fourth edge and the fifth edge are moveably connected forming an apex.

15. The PV system of claim 1, further comprising an actuator configured to switch each section between the folded state and the unfolded state.

16. The PV system of claim 15, wherein the actuator comprises two or more telescoping segments.

17. The PV system of claim 1, further comprising for each section, a cover wherein:
the cover is substantially transparent to light,
the cover is positioned over the PV element and the two reflective surfaces, forming an empty space encompassed by the cover and the two reflective surfaces, and
the PV element is positioned within the empty space.

18. The PV system of claim 17, wherein the cover is configured to focus light onto the PV element.

19. The PV system of claim 1, further comprising:
at least one flexible point or hinge positioned at each base of each section, wherein:
each first edge of each reflective surface is capable of moving around the first axis when the PV system is switched between states.

20. The PV system of claim 1, wherein:
the first reflective surface and the second reflective surface form an angle a, measured at the base,
$\alpha$ is approximately zero when in the folded state, and
$\alpha$ is between greater than zero and less than 180 degrees in the unfolded state.

21. The PV system of claim 14, further comprising:
at least one flexible point or hinge positioned at each base of each section, wherein:
each first edge of each reflective surface is capable of moving around the first axis when the PV system is switched between states.

* * * * *